United States Patent Office 3,819,833
Patented June 25, 1974

3,819,833
**ANTIBIOTIC LARGOMYCIN AND A METHOD OF PRODUCING SAME BY CULTIVATING *STREPTOMYCES PLURICOLORESCENS* NRRL 3679**
Nakao Ishida, Sendai, and Tomoharu Okuda, Tokyo-to, Japan, assignors to Tanabe Seiyaku Co., Ltd., Osaka, Japan
Filed Feb. 16, 1970, Ser. No. 11,770
Claims priority, application Japan, Feb. 19, 1969, 44/12,351
Int. Cl. A61k *27/00*
U.S. Cl. 424—117          10 Claims

ABSTRACT OF THE DISCLOSURE

A novel antibiotic largomycin, consisting of at least three components designated as F I, F II and F III respectively, produced by cultivating *Streptomyces pluricolorescens* NRRL 3679 in a nutrient medium under aerobic conditions and recovering the accumulated antibiotic from the fermentation broth. The antibiotic exhibits antimicrobial activity and activity against Ehrlich's ascites carcinoma in mice.

---

Figure 1:
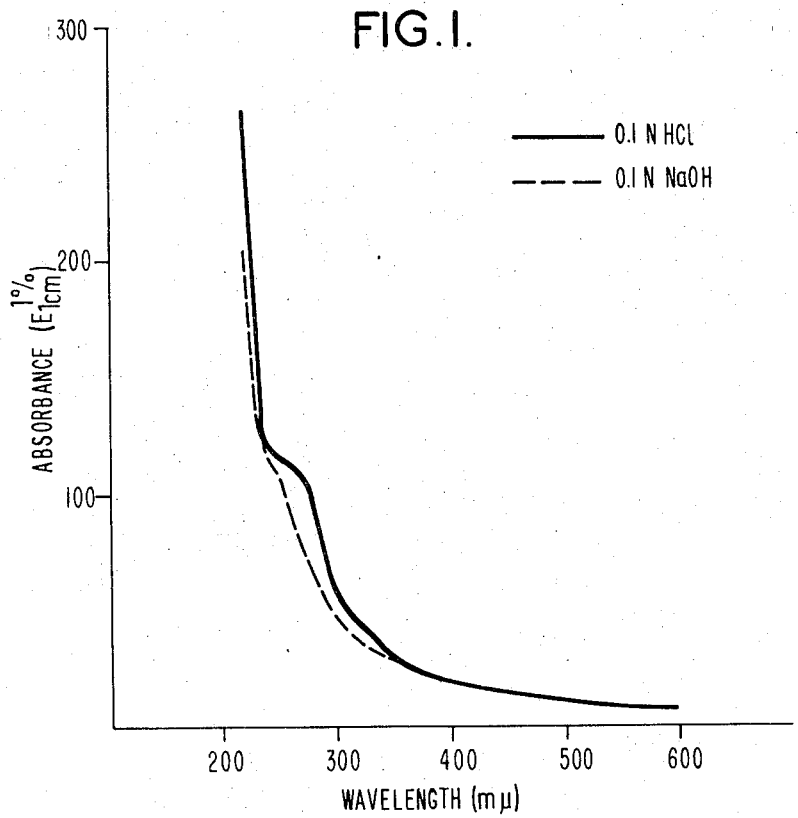

The present invention relates to a useful antibiotic designated "largomycin" and, more particularly, to its production by fermentation, to methods for its recovery and concentration from crude solutions, such as fermentation broths, and to processes for its purification. The invention encompasses the antibiotic in dilute forms, as crude concentrates, and in pure forms. These novel products are especially useful in combating pathogenic microorganisms and controlling Ehrlich's ascites carcinoma in mice.

In the course of searching for new antibiotics, a streptomyces species indexed MCRL 0367 in the collection of the Microbial Chemistry Research Laboratory of Tanabe Seiyaku Co., Ltd., Osaka, Japan, and on deposit with the Agricultural Research Service Culture Collection of the United States Department of Agriculture, Ill., U.S.A. under the accession number NRRL 3679 which deposit has been added to the culture collection of the United States Department of Agriculture at Peoria, Illinois and was made available to the public as of July 30, 1969 has been found to produce at least one antibiotic.

Streptomyces NRRL 3679 shows the following microbiological characteristics.

Morphological Characteristics

On natural and synthetic media, the strain shows good growth forming substrate mycelium. The aerial mycelia branched in tuft are formed on synthetic medium. No spiral or whirl is formed. Cylindrical spores of 0.4 to 0.6$\mu$ x 0.9 to 1.4$\mu$ in size are formed at the terminal of aerial mycelia. On the electron microscopic observation, the surface of spores is flat and smooth.

Culture Characteristics

The numbers in parentheses represent the tone of color indicated in the "Color Index" published by the Japan Color Research Laboratory.

(1) Czapek's sucrose nitrate agar plate (at 27° C.): colorless growth; forming pale olive (8–18–2) to yellowish gray (7–19–1) powdery aerial mycelia; producing pale purple (20–17–3) soluble pigment.

(2) Glycerol nitrate agar plate (at 27° C.).: grayish red brown (2–14–3) growth with brownish purple (24–12–3) reverse; forming pale pink (2–18–2) powdery aerial mycelia; producing reddish brown (3–14–4) soluble pigment.

(3) Glucose nitrate agar plate (at 27° C.): light yellowish orange (5–18–5) growth with light brown (4–15–4) reverse; forming brownish white (6–19–1) aerial mycelia; producing yellowish orange (6–18–6) soluble pigment.

(4) Krainsky's asparagine glucose agar plate (at 27° C.): pale yellow brown (7–18–3) growth with pale yellowish brown (6–18–3) reverse; forming brownish white (6–19–1) powdery aerial mycelia; producing pale yellow (8–19–2) soluble pigment.

(5) Calcium malate agar plate (at 27° C.): reddish black (2–11–1) growth with dark brown purple (1–11–4) reverse; forming pale yellow (8–19–2) to pale orange (5–19–2) powdery aerial mycelia; producing brown (4–14–5) soluble pigment.

(6) Starch agar plate (at 27° C.): light reddish yellow (7–19–5) growth with reddish yellow (7–18–6) reverse; forming brownish white (6–19–1) powdery aerial mycelia; producing yellow orange (5–17–6) soluble pigment.

(7) Tyrosine agar plate (at 27° C.): yellowish brown (6–16–3) growth with pale yellowish orange (6–19–3) reverse; forming pale orange (5–19–2) aerial mycelia; producing pale yellowish brown (7–17–3) soluble pigment.

(8) Czapek's glucose nitrate solution (at 27° C.): growth in yellowish brown (6–16–3) pellicle forming no aerial mycelium; producing pale yellow (7–19–4) soluble pigment.

(9) Cellulose medium (at 27° C.): poor growth; forming no aerial mycelium; producing no soluble pigment.

(10) Bennett's agar slant (at 27° C.): colorless growth with brown (4–13–5) reverse; forming pale orange (5–19–2) powdery aerial mycelia; producing reddish brown (3–12–5) soluble pigment.

(11) Nutrient agar slant (at 37° C.): colorless to cream (7–19–3) growth with pale yellow (7–19–4) reverse; forming no aerial mycelium; producing no soluble pigment.

(12) Glucose nutrient agar slant (at 37° C.): dull orange (5–17–4) growth with reddish yellow (7–18–6) reverse; forming no aerial mycelium; producing no soluble pigment.

(13) Peptone glucose agar plate (at 37° C.): dull orange (5–17–4) growth with reddish yellow (7–18–6) reverse; forming slightly white aerial mycelia; producing no soluble pigment.

(14) Blood agar plate (at 37° C.): cream to yellow (8–15–5) growth; forming no aerial mycelium; producing no soluble pigment.

(15) Egg medium (at 37° C.): dull yellow (7–18–4) growth; forming no aerial mycelium; producing no soluble pigment.

(16) Gelatin stab (at 18° C.): cream to brown (4–14–3) growth; forming no aerial mycelium; producing reddish brown (3–14–4) soluble pigment.

(17) Litmus milk (at 37° C.): ring, pale yellowish brown (7–17–3) growth; forming no aerial mycelium; changing the color to pale pink (3–19–2); showing acidic pH.

(18) Loeffler's coagulated serum (at 37° C.): colorless to cream (7–19–3) wrinkled growth; forming no aerial mycelium; producing no soluble pigment.

(19) Potato plug (at 37° C.): colorless to cream (7–19–3) growth; forming no aerial mycelium; not changing the color of plug.

Utilization of Carbon Sources

On the Pridham-Gottlieb's basal medium, the strain shows the following utilization of carbon sources:
Good utilization—arabinose, glucose, glycerol, maltol, mannitol, mannose, rhamnose, xylose and starch.
Utilization—fructose, lactose and sucrose.
Doubtful utilization—salicin.
No utilization—inositol and raffinose.

Physiological Characteristics

The strain is positive in calcium malate solubility, nitrate reduction, starch hydrolysis, hemolytic property, gelatin liquefaction, serum liquefaction, milk coagulation and milk peptonization, and negative in cellulase reaction, tyrosinase reaction and melanin formation.

Temperature and pH for Growth

The strain shows good growth at 27° C. in a pH range of 6 to 9. At 10 and 30° C., it can grow at pH 7.0 and 8.0, but not at pH 4.0 and 5.0. Irrespective of pH, no growth can be seen at 60° C. The strain is aerobic.

From the above mentioned properties, the strain NRRL 3679 is definite to be a Streptomyces of a nonchromogenic type, red series and *Rectus-flexibilis* section. According to the classification system proposed by Waksman [J. Bact., 56, 107 to 114 (1948)], the strain NRRL 3679 can be classified into the section A–1–6 to which belongs a Streptomyces forming no whirl, no melanoid pigment and producing yellowish brown to reddish brown soluble pigments. Among Streptomyces in this section, *Streptomyces pluricolorescens* Okami et Umezawa [Waksman's "The Actinomycetes," vol. 2, p. 259 (1961); J. Antibiotics, Ser. A, 9, 75 to 81 (1956)] shows a resemblance of property to the strain NRRL 3679. However, the former strain is different from the strain NRRL 3679 in the following properties. In a gelatin stab, *Streptomyces pluricolorescens* grows colorless with beige colored aerial mycelia and produces a slightly yellowish brown soluble pigment. In spite of the minor differences described above, *Streptomyces pluricolorescens* and Streptomyces sp. NRRL 3679 are quite similar in other properties including the morphological and physiological properties and the utilization pattern of carbon sources. Therefore, the largomycin-producing strain NRRL 3679 is thus identified as a strain of "*Streptomyces pluricolorescens.*"

It is to be understood that for the production of largomycin the present invention is not limited to the use of *Streptomyces pluricolorescens* NRRL 3679. It is especially desired and intended to include the use of natural or artificial mutants or variants produced therefrom. The artificial production of mutants or variants may be accomplished by a conventional operation such as X-rays, ultraviolet radiation and nitrogen mustards. It is further desired and intended to include the use of largomycin-producing strains which conform to the same species of the above strain.

In accordance with one aspect of the present invention, the new antibiotic largomycin is produced during cultivation of the microorganism, i.e. a largomycin-producing strain of *Streptomyces pluricolorescens,* in an aqueous nutrient medium at a temperature of about 25 to about 30° C., preferably at 27 to 28° C., under aerobic conditions. The composition of this nutrient medium may be varied over a very wide range. Essentially what is required is a carbon source, a nitrogen source and trace inorganic elements. Examples of suitable carbon sources are glucose, lactose, maltose, starch and glycerol. Suitable source of nitrogen for the fermentation process include peptone, meat extract, yeast, corn steep liquor, soybean meal, peanut meal, protein hydrolyzate, inorganic nitrates and ammonium sulfate. Examples of suitable sources of inorganic elements are sodium chloride, calcium chloride, magnesium sulfate, calcium carbonate, phosphates and salts of heavy metals such as iron, zinc, copper and manganese. The nutrient medium may be adjusted to about pH 6 to 8 prior to inoculation of the microorganism. The pH tends to remain rather constant during the fermentation but, if variations are encountered, a buffering agent such as calcium carbonate may be added to the medium. If excessive foaming is encountered, anti-foaming agents such as vegetable oils, lard oil and silicon oil may be added to the fermentation medium prior to or in the course of the fermentation. The maximum yield of the antbiotic largomycin can be obtained within about 70 to about 100 hours of fermentation under optimum conditions of temperature and aeration.

After growth of the microorganism, the mycelium is removed from the fermentation broth by using standard equipments such as filter presses and centrifuges, and then the antibiotic largomycin is recovered from the filtrate by a variety of conventional separation procedures such as a precipitation procedure and an adsorption procedure. Of these procedures, the following are particularly preferred: addition of ammonium sulfate or sodium sulfate to the filtrate of the fermentation broth either with or without prior concentration so as to precipitate the antibiotic, adjustment of the filtrate to an appropriate pH (e.g. pH 3.5 to 5.0) so as to precipitate the antibiotic, addition of a water-miscible organic solvent (e.g. methanol, ethanol, acetone) to the filtrate so as to precipitate the antibiotic, etc.

Figure 8:
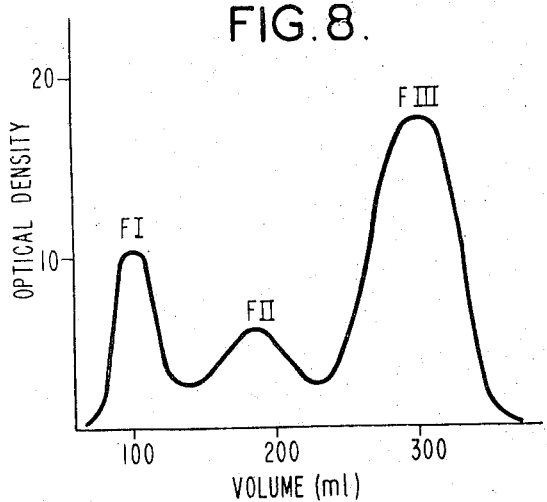

The thus obtained antibiotic in a crude state includes various proteinous materials, among which the presence of three active components showing anti-microbial activity is particularly notable. For instance, the gel-filtration of the crlude antiobiotic on dextran gel of which water regain is about 10.0 g./g. manufactured by Pharmacia, Uppsala, Sweden under the trade name "Sephadex G–100" results in the elution pattern as shown in FIG. 8 of the accompanying drawings [the pattern being drawn up by the following procedures: dissolving the antibiotic (500 mg.) in a 0.01 M phosphate buffer of pH 7.0, pouring the solution onto a column packed with Sephadex G–100 (1 l. in wet state), eluting the column with a 0.01 M phosphate buffer of pH 7.0, collecting the eluate (10–15 ml.) on a fraction collector, measuring the amount of protein in each fraction as a function of optical density at 280 m$\mu$ and plotting on a graph the relationship between the volume of the eluate and the amount of the eluated protein], from which the ratio of the active components designated respectively as "F I," "F II" and "F III" is calculated to be approximately 1.2: 1:4.

The separation of one or more active components from the said antibiotic in crude state may be accomplished by ammonium sulfate fractionation and/or pH fractionation.

That is, the crude antibiotic is subjected to fractionation by extracting with an aqueous solution of ammonium sulfate of not less than 0.5 saturation (Hofmeister's saturation) whereby the fraction of the active component F I which is insoluble in the said solution and the fraction of the active components F II and F III which are soluble in the said solution are separated. Preferably, the above fractionation is carried out in two steps. For example, the crude antibiotic is treated with an aqueous solution of ammonium sulfate of 0.7 saturation to extract contaminating proteinous impurities and then the residue is treated with an aqueous solution of ammonium sulfate of 0.5 to 0.6 saturation to separate into the insoluble portion of the active component F I and the soluble portion of the active components F II and F III, both portions being contaminated with only a small amount of proteinous impurities. The use of an aqueous solution of ammonium sulfate of 0.53 to 0.56 saturation is particularly preferred for the effective extraction of the active components F II and F III. The active components F II and F III present in the portion of the active component F I as impurities can be partly recovered by treating the said portion with an aqueous solution of ammonium sulfate of 0.3 to 0.4 saturation. The addition of ammonium sulfate in excess to the extract containing the active components F II and F III produces precipitates in which the amount of the active component F III is estimated to be about 2.5 times that of the active component F II and the amount of the active component F I is not more than $\frac{1}{10}$ that of the active component F II. Most of the proteinous impurities present in the antibiotic in the crude state are removed from the above obtained product.

As a means of separating the product containing the active components F II and F III into the respective components, said product is subjected to pH fractionation. Thus the product is washed with an aqueous salt solution of pH 3 to 5, preferably of pH 3.5 to 4.3, whereby the soluble portion of the active component F III and the insoluble portion of the active component F II are separated. The addition of ammonium sulfate to the said soluble portion yields precipitates, which are collected by a conventional operation such as filtration or centrifugation to obtain the active component F III in a high state of purity. This product contains less than 5% by weight of the active component F I and no detectable amount of the active component F II. The above separated insoluble portion containing the active component F II may be contaminated with a small amount of proteinous impurities and can be treated with an aqueous solution of a salt of about pH 6.0 for removal of the insoluble impurities. The resultant solution is then saturated with ammonium sulfate to form precipitates. In the precipitates, the active component F II is present in an amount greater than 70% by weight, which is significantly higher than the amount of 16% by weight found in the antibiotic when in the crude state.

The salt solution suitable for the pH fractionation may be, for example, acetic acid-sodium acetate buffer. For enhancing the effect, ammonium sulfate is incorporated into the buffer to control the saturation around 0.5.

Although the fractionation in the illustrations above is first carried out with ammonium sulfate and then followed by pH fractionation, the sequence of steps may easily be reversed.

Each of the above obtained active components F I, F II and F III may be further purified by suitable operations such as salting out, gradient extraction, isoelectric point precipitation, gel-filtration, column chromatography, electrophoresis, semipermeable membrane dialysis and the like. For instance, a solution containing the active component F II is gel-filtered using Sephadex G–100 and the eluates containing the active component F II are collected. The collected fractions are dialyzed and the inner solution after dialysis is lyophilized to obtain a powder. The powder consists of the active component F II having a high degree of purity but the presence of trace impurities may occasionally be detected by disc electrophoresis on acrylamide gel. In such cases, the powder is subjected to chromatography on an ion-exchanger such as AE cellulose or preparative disc electrophoreses on an acrylamide gel, followed by gel-filtration and semipermeable membrane dialysis to yield the active component F II. The absence of contamination with impurities is confirmed by ultra-centrifugation, isoelectric point electrophoresis, disc electrophoresis and Tiselius electrophoresis.

The antiobiotic largomycin F I, isolated as described above is an acidic, pale yellow, amorphous powder showing no definite melting or decomposing point. It is precipitated with either 50% ammonium sulfate solution, 50% magnesium sulfate solution, 50% zinc chloride solution or 20% trichloroacetic acid. The isoelectric point is pH 4.2. The average analytical values of the antibiotic are as follows: C, 47.93%, H, 7.46%, N, 6.50%, S, 0.82%, ash, 12.30%. The molecular weight of the antibiotic is estimated to be more than 50,000 by the gel-filtration method. The ultraviolet absorption spectrum in 0.1 N hydrochloric acid is characterized by a maximum at 270 m$\mu$ ($E_{1cm}^{1\%}$ 110)

Figure 4:
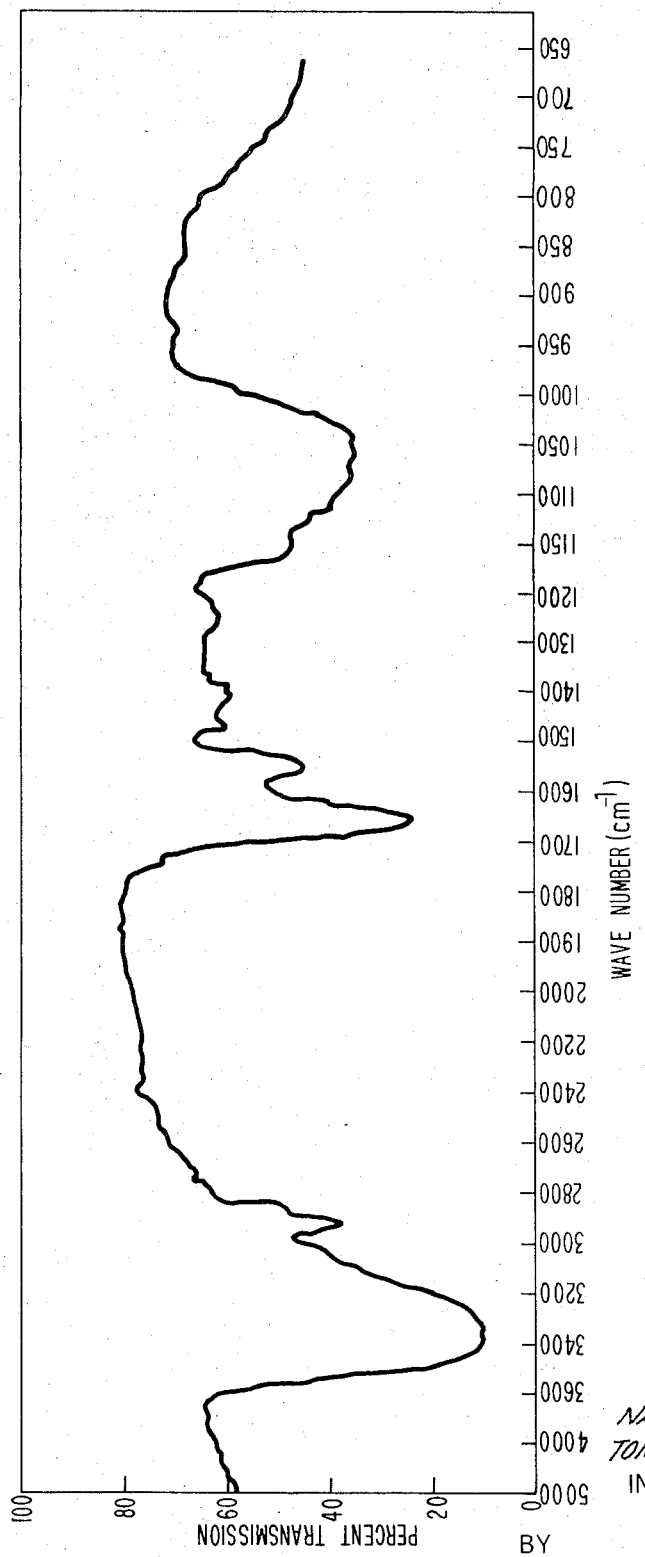

(shown in FIG. 1 of the accompanying drawings). The infrared absorption spectrum, run as potassium bromide tablet, shows the following frequencies: 3400–3330 (broad), 2920, 1660, 1550 and 1085–1040 (broad) cm.$^{-1}$ (shown in FIG. 4 of the accompanying drawings). It gives positive ninhydrin, biuret, xanthoprotein, Sakaguchi, Molish, anthrone, phenol-sulfuric acid and Folin reactions. It turns a violet color in alkaline solution. It is negative to Elson=Morgan reaction. On the amino acid analysis, the following amino acids are detected: lysine, arginine, histidine, aspartic acid, glutamic acid, threonine, serine, proline, glycine, alanine, valine, leucine, isoleucine, tryptophan, tyrosine, phenylalanine and methionine. Cystein is not detected. The sugar content determined by the phenol-sulfuric acid method [Anal. Chem., 28, 350 to 256 (1956)] is 56±1%, and the paper chromatography on the hydrolyzate with 0.24 N hydrochloric acid at 100° C. for 18 hours reveals the presence of glucose.

The antibiotic largomycin F II is an acidic, pale yellow, amorphous powder showing no definite melting or decomposing point. It is precipitated with either 50% ammonium sulfate solution, 50% magnesium sulfate solution, 50% zinc chloride solution or 20% trichloroacetic acid. The isoelectric point is pH 4.2. The average analytical values of the antibiotic are as follows: C, 47.83%, H, 8.30%, N, 13.63%, S, 0.25%, ash, none. The molecular weight of the antibiotic F II is 25,000 by the Archibald method. The ultraviolet absorption spectra in 0.1 N hydrochloric acid and 0.1 N sodium hydroxide solution are characterized respectively by a maximum at 278 m$\mu$ ($E_{1cm}^{1\%}$ 19.4)

and a maximum at 540 m$\mu$ ($E_{1cm}^{1\%}$ 4.0)

Figure 2:
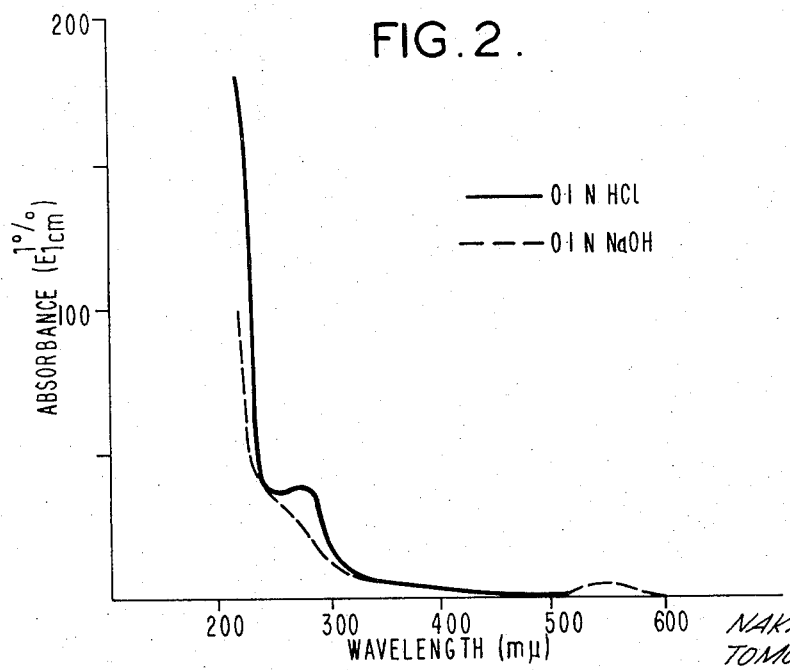

(shown in FIG. 2 of the accompanying drawings). The infrared absorption spectrum, run as potassium bromide tablet, shows the following frequencies: 3400, 2940, 1660, 1530, 1460, 1400, 1230 and 1070 cm.$^{-1}$ (shown in FIG. 5 of the accompanying drawings). The infrared absorption spectrum, run in Nujol mull, shows the following frequencies: 3300–3280, 2980–2880 (Nujol), 1660, 1550, 1470 (Nujol) and 1390 (Nujol) cm.$^{-1}$ (shown in FIG. 6 of the accompanying drawings). It gives the same color reactions as F I. On the amino acid analysis, the following amino acids are detected: lysine, arginine, histidine, aspartic acid, glutamic acid, threonine, serine, proline, glycine, alanine, valine, leucine, isoleucine, tryptophan, tyrosine, phenylalanine and methionine. The sugar content determined by the phenol-sulfuric acid method is 3±1°, and the paper chromatography on the hydrolyzate with 0.4 N hydrochloric acid at 100° C. for 18 hours reveals the presence of glucose.

The antibiotic largomycin F III is a brown, amorphous powder showing no definite melting or decomposing point. It is precipitated with either 50% ammonium sulfate solution, 50% magnesium sulfate solution, 50% zinc chloride solution or 20% trichloroacetic acid. The average analytical values of the antibiotic are as follows: C, 46.79%, H, 6.57%, N, 8.64%, S, 1.08%, ash, 13.40%. The molecular weight of the antibiotic is estimated to be 10,000 to 20,000 by the gel-filtration method. The ultraviolet absorption spectrum in 0.1 N hydrochloric acid and 0.1 N sodium hydroxide is characterized by two maxima at 275 m$\mu$ ($E_{1cm}^{1\%}$ 30.0)

and 425 m$\mu$ ($E_{1cm}^{1\%}$ 4.0)

Figure 3:
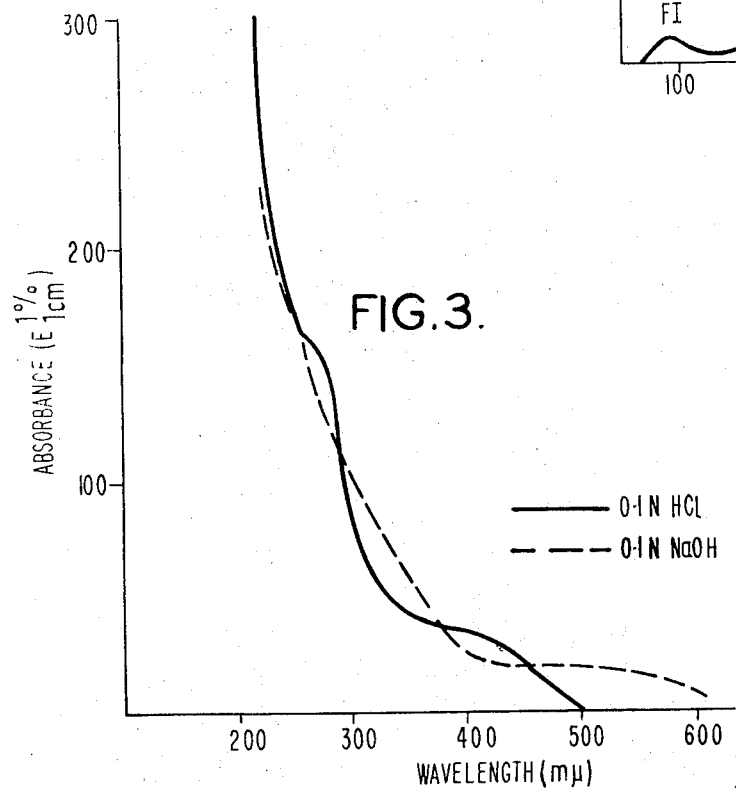
Figure 7:
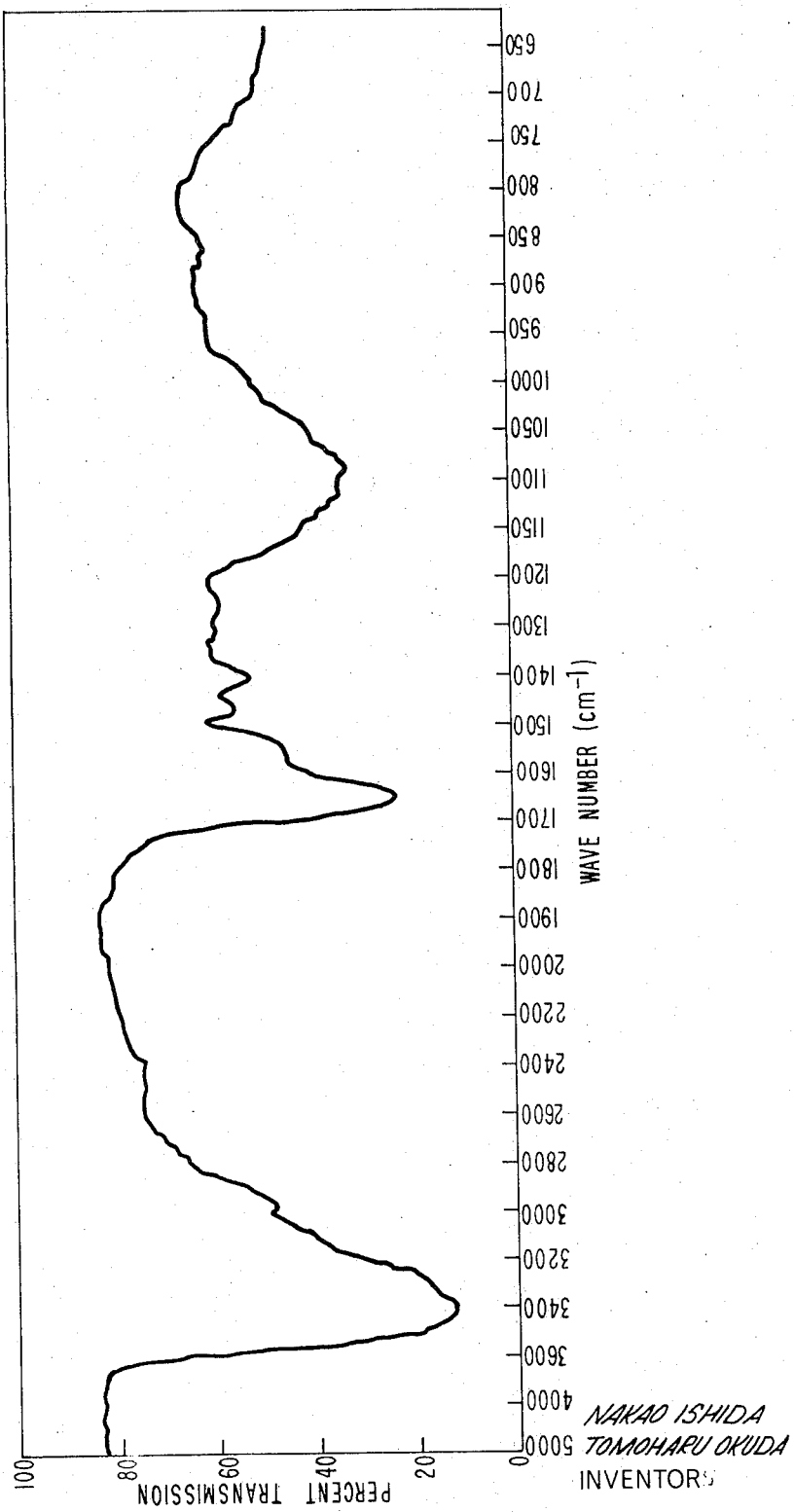

(shown in FIG. 3 of the accompanying drawings). The infrared absorption spectrum, run as potassium bromide tablet, shows the following frequencies: 3400, 2890, 1660, 1540 (shoulder), 1470, 1400 and 1090 (broad) (shown in FIG. 7 of the accompanying drawings). The color reactions of F III are the same as those of F I. The same amino acids as those found in F I are detected in the amino acid analysis. The sugar content determined by the phenol-sulfuric acid method is 22±1%, and the paper chromatography on the hydrolyzate with 0.24 N hydrochloric acid at 100° C. for 18 hours reveals the presence of glucose.

Largomycin F I, F II and F III show activity against a variety of microorganisms. The in vitro antimicrobial activities of the antibiotics determined by the agar streak method are shown in the following table:

TABLE

| Test organisms | Medium [1] | Minimum inhibitory concentration (mcg./ml.) | | |
|---|---|---|---|---|
| | | F I | F II | F III |
| Staphylococcus aureus FDA-209P | I | 100 | 100 | 100 |
| Staphylococcus aureus Terashima | I | 100 | 100 | 100 |
| Streptococcus faecalis No. 3 | I | 100 | 100 | 100 |
| Sarcina lutea PCI-1001 | I | 50 | 12.5 | 12.5 |
| Bacillus subtilis PCI-219 | I | 100 | 100 | 100 |
| Bacillus mycoides | I | 50 | 12.5 | 12.5 |
| Escherichia coli NIHJ | I | 100 | 100 | 100 |
| Shigella flexneri 2b | I | 100 | 100 | 100 |
| Sallmonella typhi | I | 100 | 100 | 100 |
| Proteus vulgaris | I | 100 | 100 | 100 |
| Pseudomonas aeruginosa | I | 100 | 100 | 100 |
| Corynebacterium xerosis | I | 50 | 6.25 | 12.5 |
| Lactobaillus brevis | II | 100 | 100 | 100 |
| Mycobacterium ATCC 607 | III | 100 | 100 | 100 |
| Xanthomonas oryzae | IV | 100 | 12.5 | 100 |
| Candida albicans 92 | IV | 100 | 100 | 100 |
| Aspergillus niger NIH | IV | 100 | 100 | 100 |
| Mycoplasma pneumoniae Mac [2] | V | 12.5 | 0.7 | 1.5 |
| Mycoplasma pulmonis mA | V | 25 | 0.7 | 1.5 |
| Mycoplasma gallisepticum PG-31 | V | 25 | 0.25 | 12.5 |

[1] Medium: I, nutrient agar; II, tomato juice agar; III, 1% glycerol nutrient agar; IV, Sabouraud's agar; V, Difco's PPLO agar.
[2] The anti-mycoplasma activity was determined by the agar plate diffusion assay method [Arai et al.: J. Antibiotics, Ser. A, 19, 118 to 120 (1960)].

From the preceding table, it is noted that the antibiotics are characteristically active against a limited number of microorganisms such as Sarcina lutea, Bacillus mycoides and Corynebacterium xerosis. It is also noted that they are significantly active against Mycoplasma.

Acute toxicity ($LD_{50}$ value) of largomycin F II when intraperitoneally administered to mice is 35.5 mg./kg.

The results of the cytotoxicity test in mammalian cell culture are shown in the following table:

TABLE

| Cells | Minimum degeneration dose (mcg./ml.) | | |
|---|---|---|---|
| | F I | F II | F III |
| HeLa S-3 | 5.0 | 0.1 | 1.25 |
| L | 1.0 | 0.25 | 0.5 |
| Human embryo kidney | 100 | 20 | 100 |
| Calf kidney | 100 | 10 | 20 |

In the preceding table, it is seen that the minimum cytotoxic doses of the antibiotics against cultured normal cells such as calf kidney and human embryo cells are much higher than those against HeLa S–3 and L cells. Thus, they have selective toxicity to HeLa S–3 and L cells.

The intraperitoneal injection of the antibiotics, particularly the active component F II, at daily doses of 0.4 to 3.2 mg./kg. for 7 consecutive days unexpectedly inhibits the increase of ascitic fluid. It also prolongs the survival period of mice bearing ascitic form of Ehrlich ascites carcinoma, Sarcoma–180 and SN–36, when the treatment starts 24 hours after the tumor cell transplantation. The number of Ehrlich ascites carcinoma cells in the ascites fluid decreases immediately after the treatment with the antibiotics. The number of mitotic cells is markedly reduced. The mitotic disturbances and chromosomal abnormalities, such as scattering adhesion or aggregation, are readily observed especially on the cells in the prophase and metaphase. On the other hand, the effect against the solid form of Ehrlich ascites carcinoma is not apparent. Thus, the activity of the antibiotic is stronger against the ascites form than against the solid form of the same tumor.

As can readily be appreciated from the above descriptions, the antibiotics largomycin F I, F II and F III are useful as agents for inhibiting the growth of pathogenic microorganisms and HeLa S–3 and Ehrlich's ascites carcinoma in mice cells. It is also useful in obtaining pure cultures of single microorganisms whereby a susceptible microorganism such as Bacillus mycoides may be separated from a resistant one such as Bacillus subtilis.

A practical and presently-preferred embodiment of the invention is illustratively shown in the following example, in which parts are by weight.

The term "minimum effective dose" hereinafter used is intended to mean a minimum dose of the test compound resulting in complete disappearance of the ascitic fluid retention when a certain amount of the test compound is intraperitoneally administered to mice transplanted Ehrlich ascites carcinoma for 5 consecutive days from 24 hours after the transplantation and the observation is made on the 3rd day after the interruption of administration.

Example 1

A nutrient medium (1,200 l.) of pH 7.0 is charged into a 2000 liter fermentation tank. The nutrient medium contains the following materials:

| Material: | Percent (weight/volume) |
|---|---|
| Glycerol | 2 |
| Starch | 2 |
| Peptone | 0.5 |
| Meat extract | 0.5 |
| Sodium chloride | 0.5 |
| Calcium carbonate | 0.5 |

After sterilization at 120° C. for 30 minutes, the medium is inoculated with a seed culture (150 l.) of Streptomyces pluricolorescens NRRL 3679 obtained by cultivation in a nutrient medium having the same composition as above for 48 hours. Cultivation is carried out at 27° C. under aeration with 6000 l./minute while agitation at 140 to 180 r.p.m., during which the inner pressure is maintained at 0.5 kg./$cm^2$. When significant foaming is encountered, an appropriate amount of an anti-foaming agent is added to the medium. After 90 hours, the cultivation is interrupted. The fermentation broth, which inhibits the growth of Ehrlich ascites carcinoma in mice even when diluted in about 300 folds, is filtered by the aid of diatomaceous earth. The mycelial cake is washed with water, and the washing is combined with the filtrate. To the resulting solution (1100 l.), there are added portionwise diatomaceous earth (9 kg.) and then ammonium sulfate (750 kg.) while stirring. After being allowed to stand at 10° C. overnight, the precipitate is collected by filtration to obtain the antibiotic material (47.5 kg.) as a wet product.

A part of the antibiotic material is extracted with water. The extract is dialyzed to a cellophane film, and the liquid within the film is lyophilized. The thus obtained powder exhibits a minimum effective dose of 1.6 mg./kg./day against Ehrlich ascites carcinoma in mice. The lyophilized powder (500 mg.) thus obtained can be fractionized on Sephadex G–100 to give the fractions F I, F II and F III in the ratio of 1.2:1.0:4.0 (cf. the elution pattern shown in FIG. 8 of the accompanying drawings). On the acrylamide gel disc electrophoresis at pH 8.5, the presence of numerous protein-like substances in the said lyophilized powder is confirmed.

Figure 9:
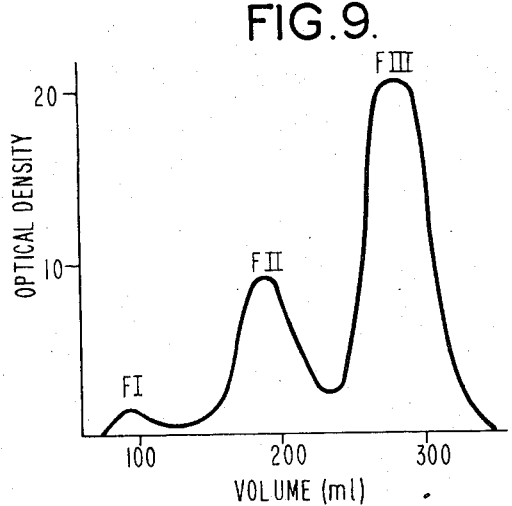

The above obtained wet antibiotic material (1 kg.) is washed with an aqueous solution of ammonium sulfate (4 l.) of 0.7 saturation, and the insoluble residue is extracted with 4 l. of an aqueous solution of ammonium sulfate of 0.5 saturation whereby the component F I remains in the insoluble material while the components F II and F III are removed from the extract. To the extract, diatomaceous earth (50 g.) and ammonium sulfate (1 kg.) are added in that order, and the resultant mixture is allowed to stand overnight in a refrigerator. The precipitate is collected by filtration to obtain the components F II and F III. The mixture is washed with 3 l. of an aqueous solution of ammonium sulfate of 0.7 saturation to eliminate soluble materials. The residue, which is confirmed to contain only a small amount of protein-like materials as seen in the said antibiotic material by the disc electrophoresis, is extracted with 2 l. of an aqueous solution of ammonium sulfate of 0.5 saturation. To the extract, diatomaceous earth (50 g.) and ammonium sulfate (500 g.) are added, and the resultant mixture is allowed to stand overnight in a refrigerator. The precipitate is collected by filtration to obtain a product containing abundantly the components F II and F III. A portion of the product is extracted with water and dialyzed to a cellophane film. The liquid retained within the film is lyophilized to give a powder, of which the minimum effective dose against Ehrlich ascites carcinoma in mice is 0.4 mg./kg./day. As shown in FIG. 9 of the accompanying drawings, gel-filtration of the powder with Sephadex G–100 shows that the ratio of the components F I, F II and F III in the said powder is 0.1:1.0:2.5. The insoluble material containing the component F I obtained in the course of the above operation is subjected to salt elimination in the same manner as above to afford a powder, of which the minimum effective dose against Ehrlich ascites carcinoma in mice is 10.0 mg./kg./day.

Figure 10:
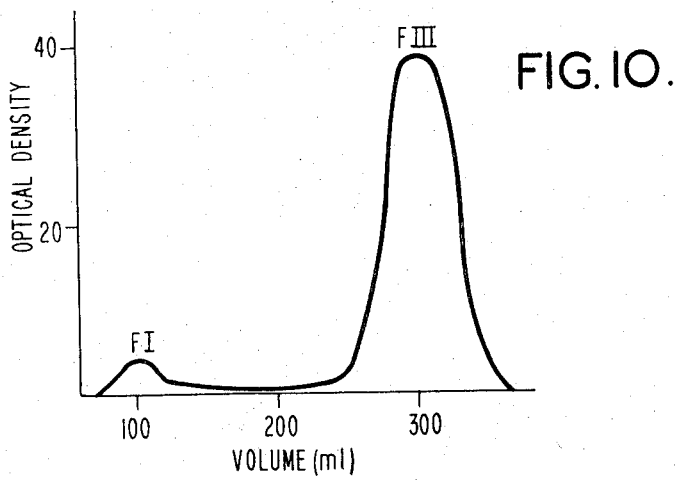

The product containing the components F II and F III as obtained above in wet state is extracted with 2 l. of a 0.05 M acetic acid-sodium acetate buffer solution (pH 4.0) containing ammonium sulfate in 0.5 saturation. Ammonium sulfate (500 g.) is added to the extract (2 l.), and the resultant mixture is allowed to stand overnight in a refrigerator. The precipitate is collected by centrifugation, dissolved in a small amount of distilled water and dialyzed through a semipermeable membrane. The liquid retained within the membrane is lyophilized to give brown powder (1 g.) containing the component F III, of which the minimum effective dose against Ehrlich ascites carcinoma in mice is 0.8 mg./kg./day. When the powder (500 mg.) is subjected to gel-filtration with Sephadex G–100, an elution pattern as shown in FIG. 10 is obtained. The pattern confirms that the amount of the component F I contaminating the powder is only about 5% of that of the main component F III.

Figure 11:
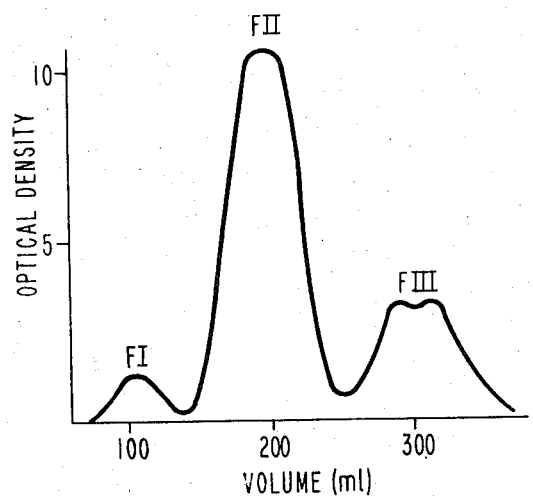

The insoluble material not extracted with a 0.05 M acetic acid-sodium acetate buffer in the above operation is extracted with 3 l. of a 0.05 M acetic acid-sodium acetate buffer solution (pH 6.0) containing ammonium sulfate in 0.5 saturation and having a pH of 6.0. Ammonium sulfate (750 g.) is dissolved in the extract, and the resulting solution is allowed to stand overnight in a refrigerator. The precipitate is collected by centrifugation, dissolved in a small amount of distilled water and dialyzed through a semipermeable membrane overnight. The inner liquid is lyophilized to give a light brown powder (1.5 g) containing the component F II, of which the minimum effective dose against Ehrlich ascites carcinoma in mice is 0.2 to 0.4 mg./kg./day. The elution pattern on gel-filtration of the powder (500 mg.) with Sephadex G–100 is shown in FIG. 11 of the accompanying drawings, from which it is confirmed that the ratio of the components F I, F II and F III is 0.1:1.0:0.3.

Figure 12:
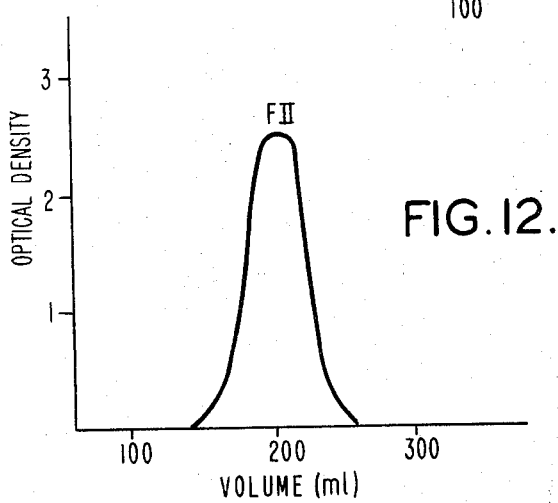

The above obtained powder (500 mg.) is subjected to gel-filtration with Sephadex G–100. The eluate is collected on a fraction collector in 10 ml. fractions. The amount of protein in each fraction is determined by absorbancy at a wave length of 280 m$\mu$. The fractions containing the component F II are combined and dialyzed through a cellophane film against water. The inner liquid after dialysis is lyophilized to give yellow powder (150 mg.), of which the minimum effective dose against Ehrlich ascites carcinoma in mice is 0.2 mg./kg./day. On gel-filtration of the powder (50 mg.) with Sephadex G–100, an elution pattern as shown in FIG. 12 of the accompanying drawings is obtained. From this pattern, the product appears to be substantially pure, however, the presence of a trace amount of impurities is detected by disc electrophoresis.

The above obtained powder (100 mg.) is dissolved in a tris-glycine buffer of pH 8.5 and subjected to preparative electrophoresis using a 20 ml. polyacrylamide gel column at an electric voltage of 600 v. and an electric current of 10 ma. for 6 hours. The polyacrylamide layer bearing the component F II is cut off, crushed and extracted with water. The extract is subjected to gel-filtration with Sephadex G–100 (200 ml. in wet state). The eluate is collected on a fraction collector in 5 ml. fractions. The fractions containing the component F II are combined and dialyzed with a semipermeable membrane. The liquid retained within the membrane is lyophilized to give a pale yellow powder (10 mg.), which is confirmed by various procedures to be the component F II in a high state of purity.

The powder confirmed to consist of only the component F II by the gel-filtration may be also obtained by column chromatography with AE cellulose. Namely, the powder (20 mg.) is disolved in distilled water (2 ml.), and the solution is poured onto a column of AE cellulose (0.9 cm. x 22 cm.) treated with a 0.01 M phosphate buffer of pH 7.0. After washing well with the buffer, the column is eluted successively with phosphate buffers of serial molar concentrations varying from 0.01 to 0.2 M (pH 7.0). The eluates with phosphate buffers of 0.05 to 0.09 molar concentration, which can effectively elute the component F II, are combined and dialyzed with a semipermeable membrane. The liquid retained within the membrane is lyophilized and dissolved in a small amount of water. The aqueous solution is poured onto a column of Sephadex G–100 (25 ml.) and subjected to gel-filtration using distilled water as a developing solvent. The eluates containing the component F II are combined and lyophilized to give the component F II (3.5 mg.).

What is claimed is:

1. A process for producing largomycin antibiotic, which comprises cultivating Streptomyces NRRL 3679 in an aqueous nutrient medium under aerobic conditions, and recovering the accumulated antibiotic from the fermentation broth.

2. The process according to claim 1, wherein the cultivation is carried out under submerged aerobic conditions.

3. The process according to claim 1, wherein the cultivation is carried out at a temperature of from about 25° to about 30° C.

4. The process according to claim 1, wherein the cultivation is carried out for a period of from about 70 to about 100 hours.

5. The process according to claim 1, wherein the cultivation is carried out under submerged aerobic conditions at a temperature of from about 25° to about 30° C. for a period of from about 70 to about 100 hours.

6. The process according to claim 1, wherein the recovery of the antibiotic from the fermentation broth is carried out by filtering the fermentation broth, saturating the filtrate with ammonium sulfate and collecting the precipitate.

7. The process according to claim 1, followed by subjecting the recovered antibiotic to fractionation with aqueous ammonium sulfate solution of not less than 0.5 saturation to separate a first insoluble active component and a first soluble active component.

8. The process according to claim 7, followed by subjecting the first soluble active component to fractionation with an aqueous salt solution of pH 3 to 5 to separate a second insoluble active component and a second soluble active component.

Figure 5:
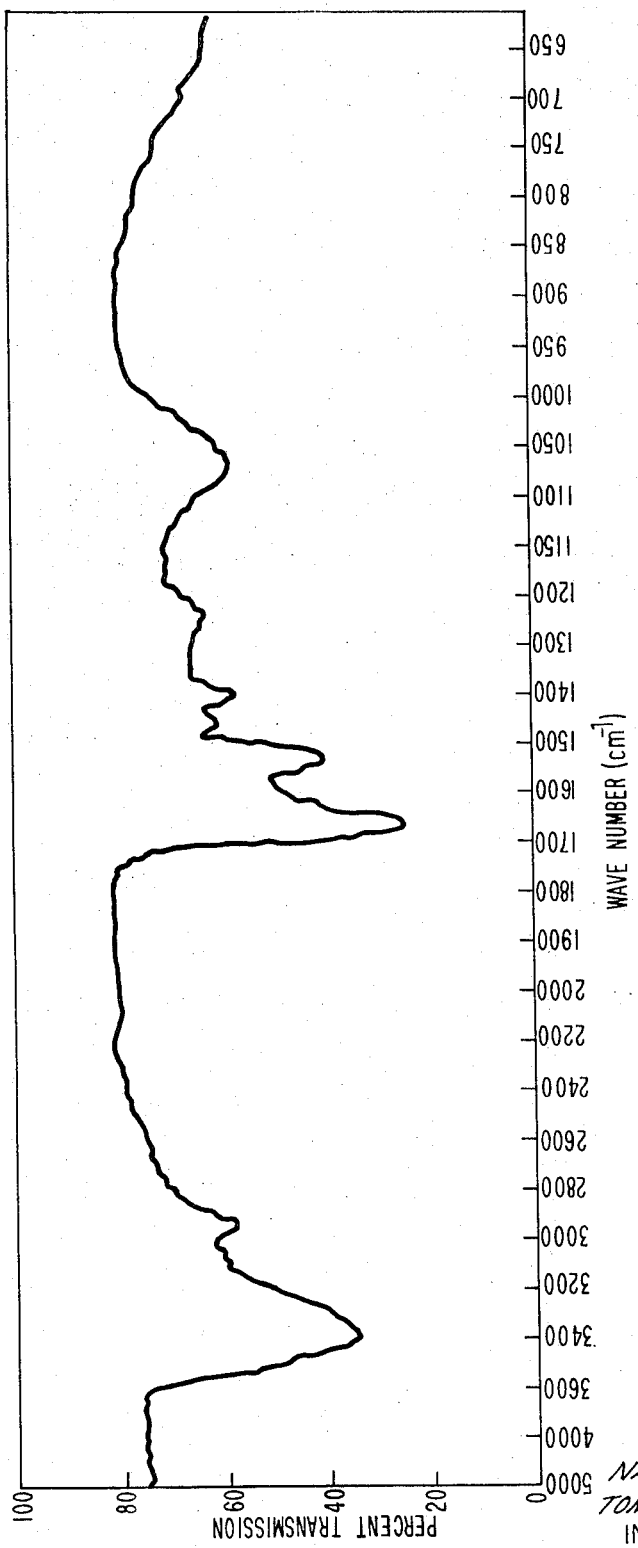
Figure 6:
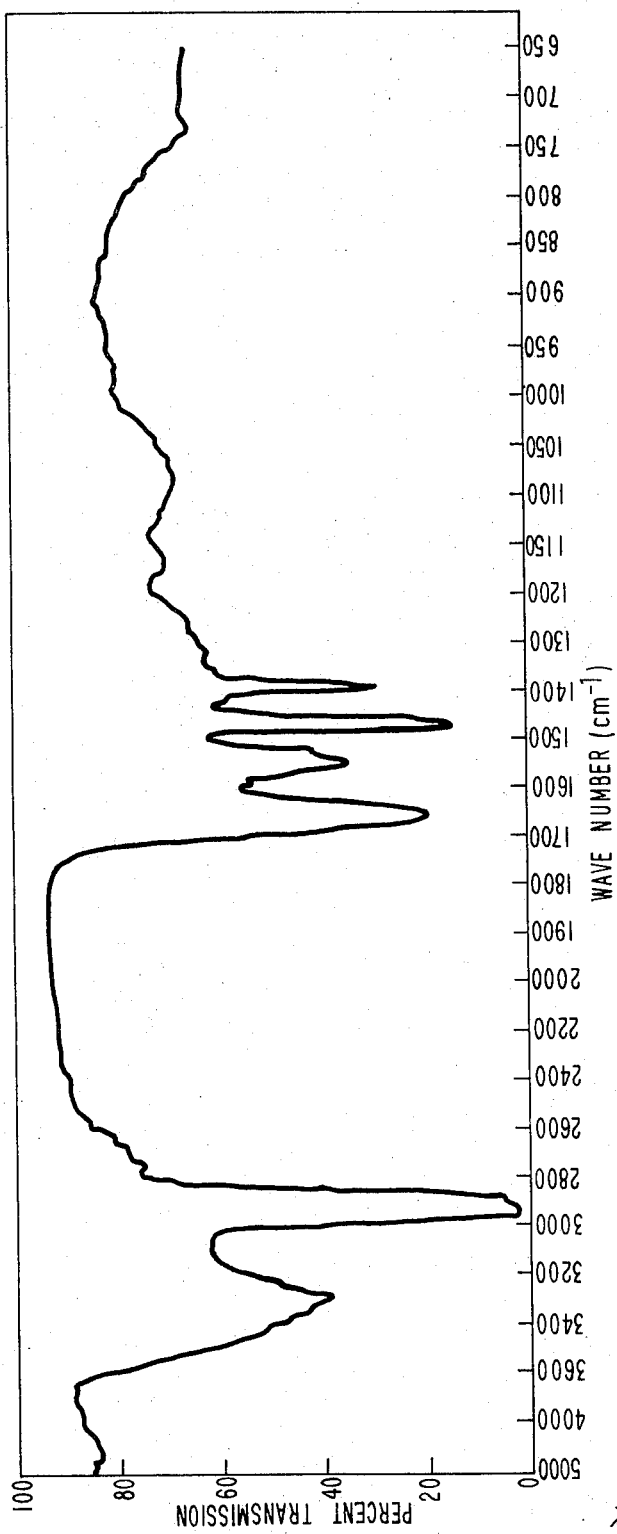

9. The antibiotic, largomycin F II, said antibiotic being an acidic, pale yellow, amorphous powder having no definite melting or decomposing point, being precipitated with a solution selected from the group consisting of 50% ammonium sulfate solution, 50% magnesium sulfate solution, 50% zinc chloride solution and 20% trichloroacetic acid, having an isoelectric point of pH 4.2, containing the elements of carbon, hydrogen, nitrogen and sulfur in substantially the following proportions by weight:

| | Percent |
|---|---|
| Carbon | 47.8 |
| Hydrogen | 8.3 |
| Nitrogen | 13.6 |
| Sulfur | 0.25 | having an ultraviolet absorption spectrum as shown in FIG. 2:

having an infra red absorption spectrum as shown in FIG. 5, turning a violet color in alkaline solution, giving positive ninhydrin, biuret, xanthoprotein, Sakaguchi, Molish, anthrone, phenol-sulfuric acid and Folin reactions and negative Elson-Morgan reaction, containing as amino acid constituents at least one of lysine, arginine, histidine, aspartic acid, glutamic acid, threonine, serine, proline, glycine, alanine, valine, leucine, isoleucine, tryptophan, tyrosine, phenylalanine and methionine.

10. A method of inhibiting the growth of microorganisms comprising the steps of contacting said microorganisms with an effective dosage of antibiotic, largomycin F II, said antibiotic being an acidic, pale yellow, amorphous powder having no definite melting or decomposing point, being precipitated with a solution selected from the group consisting of 50% ammonium sulfate solution, 50% magnesium sulfate solution, 50% zinc chloride solution and 20% trichloroacetic acid, having an isoelectric point of pH 4.2, containing the elements of carbon, hydrogen, nitrogen and sulfur in substantially the following proportions by weight:

| | Percent |
|---|---|
| Carbon | 47.8 |
| Hydrogen | 8.3 |
| Nitrogen | 13.6 |
| Sulfur | 0.25 | having an ultraviolet absorption spectrum as shown in FIG. 2:

having an infra red absorption spectrum as shown in FIG. 5: turning a violet color in alkaline solution, giving positive ninhydrin, biuret, xanthoprotein, Sakaguchi, Molish, anthrone, phenol-sulfuric acid and Folin reactions and negative Elson-Morgan reaction, containing as amino acid constituents at least one of lysine, arginine, histidine, aspartic acid, glutamic acid, threonine, serine, proline, glycine, alanine, valine, leucine, isoleucine, tryptophan, tyrosine, phenylalanine and methionine.

References Cited
UNITED STATES PATENTS

| 3,313,691 | 4/1967 | Miyake et al. | 424—115 |
|---|---|---|---|
| 3,328,248 | 6/1967 | Rao et al. | 424—115 |

ALBERT T. MEYERS, Primary Examiner

DAREN M. STEPHENS, Assistant Examiner

U.S. Cl. X.R.

424—115